United States Patent [19]

Matsumoto et al.

[11] Patent Number: 5,188,899

[45] Date of Patent: Feb. 23, 1993

[54] SILICA-CORE SILICONE-SHELL PARTICLES, EMULSION CONTAINING THE SAME DISPERSED THEREIN, AND PROCESS FOR PRODUCING THE EMULSION

[75] Inventors: Makoto Matsumoto; Junichiro Watanabe, both of Tokyo, Japan

[73] Assignee: Toshiba Silicone Co., Ltd., Tokyo, Japan

[21] Appl. No.: 620,122

[22] Filed: Nov. 30, 1990

[30] Foreign Application Priority Data

Dec. 18, 1989 [JP] Japan .................... 1-327686
Jun. 26, 1990 [JP] Japan .................... 2-170829

[51] Int. Cl.$^5$ .............................. B32B 21/02
[52] U.S. Cl. .................... 428/405; 428/429; 428/447; 524/492; 524/837
[58] Field of Search ............ 428/402, 403, 404, 405, 428/429, 447; 525/902; 524/492, 837

[56] References Cited

U.S. PATENT DOCUMENTS

| | | | |
|---|---|---|---|
| 3,689,300 | 9/1972 | Bunger et al. | 428/391 |
| 4,072,796 | 2/1978 | Reinhardt et al. | 428/405 |
| 4,482,656 | 11/1984 | Nguyen et al. | 523/212 |
| 4,677,160 | 6/1987 | Kondo et al. | 524/860 |
| 4,824,890 | 4/1989 | Glover et al. | 524/253 |
| 4,898,898 | 2/1990 | Fitzgerald et al. | 523/351 |

FOREIGN PATENT DOCUMENTS 2080547 11/1971 France.
2147598 5/1985 United Kingdom.

*Primary Examiner*—Paul J. Thibodeau
*Assistant Examiner*—Hoa T. Le

*Attorney, Agent, or Firm*—Sughrue, Mion, Zinn, Macpeak & Seas

[57] ABSTRACT

Colloidal silica-core silicone-shell particles, an emulsion containing, as a solid component, at least 30% by weight of the silica-core silicone-shell particles, and a process for producing the emulsion.

A colloidal silica-core silicone-shell particles comprising (A) from 99.9% to 5% by weight of cores which are colloidal silica particles, and
(B) from 0.1% to 95% by weight of shells comprising an organosiloxy group represented by the formula $$R_p^1(OQ)_q SiO_{\frac{4-p-q}{2}} \quad (I)$$

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 9 to 2, with proviso that (p+q) is an integer of 1 to 3, or a polyorganosiloxane represented by the average composition formula $$R_a^2 SiO_{\frac{4-a}{2}} \quad (II)$$

wherein $R^2$ represents a substituted or unsubstituted monovalent hydrocarbon group having 1 to 8 carbon atoms and a is a number of 0.8 to 3.0.

3 Claims, No Drawings

SILICA-CORE SILICONE-SHELL PARTICLES, EMULSION CONTAINING THE SAME DISPERSED THEREIN, AND PROCESS FOR PRODUCING THE EMULSION

FIELD OF THE INVENTION

The present invention relates to colloidal silica-core silicone-shell particles, an emulsion containing the particles dispersed therein, and a process for producing the emulsion. More particularly, the invention relates to colloidal silica-core silicone-shell particles which are useful for improving properties of organic polymers, comprising colloidal silica particles and a polyorganosiloxane bonded to the particles through siloxane bond, an emulsion containing dispersed therein such particles and a process for producing the emulsion.

BACKGROUND OF THE INVENTION

In recent years, nonpolluting various coating materials containing organic solvents, such as paints or adhesives, is strongly demanded from the standpoints of preventing environmental pollution and ensuring safe and hygienic working atmospheres. For this reason, the use of emulsion type coating materials is extending and they are also attracting attention in the fields where solvent-based coating materials are used.

Under these circumstances, the emulsion type coating materials are also being required to have a high film performance. Although addition of colloidal silica to organic polymer emulsions is extensively conducted to improve the film performance, there is a drawback that due to the weak adhesion between the organic polymer and the silica particles, the durability of the resulting films, such as water resistance and alkali resistance, deteriorates unavoidably in a prolong period of time.

For the purpose of improving the adhesion between colloidal silica particles and organic polymers, i.e., the interfacial adhesion between each silica particle and the organic polymer, various proposals have been made. For example, JP-B-62-58630 (the term "JP-B" as used herein means an "examined Japanese patent publication") discloses a surface-treating agent for metals which is obtained by incorporating a colloidal silica and a chromium compound into an acrylic resin obtained by the multi-stage emulsion polymerization of an organosilicon compound having both a reactive unsaturated group and an alkoxy group with several kinds of acrylic monomers. The agent can give a coating which imparts good corrosion resistance and coating suitability to the metal surface and, at the same time, is excellent in adhesion, deep draw processing properties, and anti-block properties. This surface-treating agent, however, has the following disadvantage. During the production of the acrylic resin, the alkoxy groups undergo hydrolysis to convert into silanol groups, resulting in, in some cases, formation of siloxane bonds (—SiOSi—) through subsequent condensation reactions. Since these portions which can exert an interaction with silica (i.e., alkoxy groups, silanol groups, and silaxane bonds formed by condensation of the silanol groups) are uniformly dispersed in the resulting acrylic polymer, the number of such portions present on the interface between the acrylic polymer and silica particles subsequently added is only small. Therefore, sufficient interfacial adhesion cannot be obtained.

JP-A-59-71316 (the term "JP-A" as used herein means an "unexamined published Japanese patent application") discloses an aqueous resin dispersion which is obtained by emulsion-copolymerizing an acrylic monomer, a styrene-type monomer, and an organosilicon compound having both a reactive unsaturated group and an alkoxy group in an aqueous medium in the presence of a colloidal silica. The dispersion forms a film having excellent durability and good resistance to stains. JP-A-61-155474 discloses an aqueous coating composition having functions such as durability, flame retardant properties, resistance to stains, dew condensation-preventive properties, and other properties, comprising an aqueous resin dispersion obtained by emulsion-polymerizing an acrylic monomer and an organosilicon compound having both a reactive unsaturated group and an alkoxy group in the presence of a colloidal silica, and a water-soluble or water-dispersible acrylic copolymer having an alkoxysilyl group as a binder component.

However, both of the above two proposals have the following drawback. Since in either case the emulsion copolymerization of an organosilicon compound with organic monomers is conducted in the presence of a colloidal silica, the radical copolymerization at olefin moieties, the condensation reaction of alkoxysilyl groups with Si-OH groups on the surface of colloidal silica particles, and the condensation reaction among alkoxysilyl groups proceed simultaneously. For this reason, it is difficult to complete the desired condensation reaction of alkoxysilyl groups with Si-OH groups on the surface of silica particles. Further, part of the colloidal silica particles do not take part in this condensation reaction. Therefore, the interfacial adhesion between the organic polymer and the colloidal silica particles cannot reach a sufficient level.

On the other hand, as one approach to the development of highly functional polymer materials, modification of organic polymers with silicones is being attempted in recent years so as to impart to the organic polymers the heat resistance, cold resistance, weathering resistance, flame retardant properties, and other excellent properties possessed by the silicones. However, since the silicone is an unusual polymer having a siloxane skeleton and, hence, has poor compatibility with ordinary polymers having carbon skeleton, compositions obtained by merely blending silicones with ordinary organic polymers cannot satisfactorily retain the desired properties of the silicones. It is, therefore, necessary to chemically bond a siloxane skeleton to a carbon skeleton by grafting or other means.

As such a technique, polymerization of a vinyl monomer in the presence of a polyorganosiloxane containing a vinyl or alkyl group is disclosed in, for example, JP-A-50-109282. This polymerization yields a graft copolymer, thus imparting improved impact strength to the resulting resin.

Furthermore, JP-A-60-252613, JP-A-61-106614, and JP-A-61-136510 propose to obtain a graft copolymer having a high degree of grafting and excellent impact strength by polymerizing a vinyl monomer in an emulsion of a polyorganosiloxane containing an acryloyl or methacryloyl group.

However, the graft copolymers obtained by the above methods are defective in that their mechanical properties such as impact resistance have not been improved sufficiently because polyorganosiloxanes only which are insufficient in strength are used as a rubber component. For the purpose of improving the insufficient strength of such polyorganosiloxanes, they are used in combination with tri- and tetrafunctional crosslinking agents such as an alkyltrialkoxysilane, tetraalkoxysilane, etc., but attainable improvements in strength are limited and a satisfactory polyorganosiloxane has not yet been obtained.

One possible approach to improve the above-described insufficient mechanical properties including impact resistance is to incorporate a reinforcing material such as silica into domains of a polyorganosiloxane which is one of the two major components of a graft copolymer. As a result of the incorporation of such a reinforcing material, not only the mechanical properties of the resulting graft copolymer are improved, but also new properties are expected to be imparted to the graft copolymer. In order to realize the above approach, a silicone emulsion in which a polyorganosiloxane and a silica particle are contained in the same micelle is required, and more preferably, an emulsion of colloidal silica-core silicone-shell particles each of which comprises a core which is a colloidal silica particle and a polyorganosiloxane shell covering the core through siloxane bonds is desired.

Although no literature has so far been found which reports or proposes a process clearly intended for the preparation of the above-described core-shell particles, there are some literature references disclosing processes which may result in formation of such core-shell particles. For example, JP-A-61-16929, JP-A-61-271352, and JP-A-61-272264 disclose a process for obtaining an aqueous emulsion of a silicone reinforced with colloidal silica particles, in which a hydroxyl-terminated polyorganosiloxane is condensed using a sulfonic acid-type emulsifying agent in the presence of an acidic colloidal silica. However, since the siloxane used as a raw material has a relatively high degree of polymerization, it is difficult for the initial homogenizing step to include the siloxane and a colloidal silica particle in the same micelle and, as a result, the above process necessarily yields an emulsion containing desired core-shell particles and also containing colloidal silica particles and polyorganosiloxane which have not participated in polycondensation. Therefore, even if this method is applied to the above-described process for producing a graft copolymer, it is difficult to exhibit the effect of the incorporation of colloidal silica.

JP-A-1-234468 discloses a reactive microgel composition which is obtained by mixing an organosilane compound having a polymerizable unsaturated double bond and an alkoxy group and, if necessary, other alkoxysilanes with a silica sol, and then subjecting the resulting mixture to hydrolysis and co-condensation, and the composition cures upon exposure to irradiation or heat to give films having excellent film properties. However, this composition cannot impart to organic polymers the heat resistance, cold resistance, weathering resistance, release properties, and other properties possessed by silicones, and is not intended for use in such a purpose. Further, the above reference does not suggest such use of the composition.

SUMMARY OF THE INVENTION

The present invention has been completed under the above circumstances.

Accordingly, an object of the present invention is to provide colloidal silica-core silicone-shell particles which can be graft-polymerized with other organic monomers or blended with organic polymers.

Another object of the present invention is t provide an emulsion containing such silica-core silicone-shell particles.

Still another object of the present invention is to provide a process for producing the emulsion.

The colloidal silica-core silicone-shell particles in accordance with the present invention comprise (A) from 99.9 to 5% by weight of cores which are colloidal silica particles, and (B) from 0.1 to 95% by weight of shells comprising an organosiloxy group represented by the formula

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and/or a polyorganosiloxane represented by the average composition formula

wherein $R^2$ represents a substituted or unsubstituted monovalent hydrocarbon group having 1 to 8 carbon atoms and a is a number of 0.8 to 3.0.

The emulsion in accordance with the present invention contains, as a solid component, at least 30% by weight of silica-core silicone-shell particles which comprise (A) from 80 to 5% by weight of cores which are colloidal silica particles and (B) from 20 to 95% by weight of shells comprising an organosiloxy group represented by the formula

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and/or a polyorganosiloxane represented by the average composition formula

wherein $R^2$ represents a substituted or unsubstituted monovalent hydrocarbon group having 1 to 8 carbon atoms and a is a number of 0.8 to 3.0, wherein 0.02 to 100 mole% of the sum of R: and $R^2$ are groups containing a reactive unsaturated group, and have an average particle diameter of 4 to 400 nm.

The process for producing the emulsion containing silica-core silicone-shell particles in accordance with the present invention comprises emulsifying (A) 100 parts by weight, on a solid content basis, of a colloidal silica, (B) from 1 to 1,900 parts by weight of either an organosilicon compound (a) alone represented by the formula $$R^3{}_b Si(OR^4)_{4-b} \qquad (III)$$

wherein $R^3$ which may be the same or different each represents a substituted or unsubstituted monovalent hydrocarbon group having 1 to 8 carbon atoms, $R^4$ represents an alkyl group having 1 to 6 carbon atoms, and b is an integer of 1 to 3 or a mixture of the organosilicon compound (a) and a polyorganosiloxane (b) containing a structural unit represented by the average composition formula $$R_c{}^5 SiO_{\frac{4-c}{2}} \qquad (IV)$$

wherein $R^5$ which may be the same or different each represents a substituted or unsubstituted monovalent hydrocarbon group having 1 to 8 carbon atoms and c is a number of 0.8 to 3.0, containing no hydroxyl group, and having 2 to 10 silicon atoms, wherein 0.02 to 100 mole% of the sum of $R^3$ and $R^5$ are groups containing a reactive unsaturated group, (C) from 0.1 to 5 parts by weight of an emulsifying agent per 100 parts by weight of the sum of ingredients (A) and (B) above, and (D) from 100 to 500 parts by weight of water per 100 parts by weight of the sum of ingredients (A) and (B) above, and simultaneously conducting hydrolysis and polycondensation reaction of the organosilicon compound (a), or conducting copolycondensation reaction of a hydrolyzed product of the organosilicon compound (a) and the polyarganosiloxane (b).

DETAILED DESCRIPTION OF THE INVENTION

In the silica-core silicone-shell particles in accordance with the present invention, the shell in each particle covers at least part of the surface of the core which is a colloidal silica particle, and is bonded to the core through so-called siloxane bonds between the core and the organosiloxy group or polyorganosiloxane constituting the shell and containing a reactive unsaturated group if necessary. Thus, the shell and core are integrally bonded to form a particle. On the other hand, the reactive unsaturated group which may be contained in the organosiloxy group or polyorganosiloxane easily undergoes graft polymerization with other organic monomers, or has good compatibility with organic polymers to be blended. Because of this, the reinforcing effect of the colloidal silica particles is effectively exhibited. In particular, silica-core silicone-shell particles having an average particle diameter of 4 to 400 nm easily take part in graft polymerization when an organic monomer is polymerized in the presence of such silica-core silicone-shell particles in the form of an emulsion, thus contributing to the synthesis of a reinforced polymer. Further, by reacting a constituting component or reactive component of the above silica-core silicone-shell particles in the presence of an emulsifying agent and water, an emulsion containing silica-core silicone-shell fine particles can be easily obtained.

The silica-core silicone-shell particles and the emulsion containing the silica-core silicone-shell particles in accordance with the present invention are described below with respect to their constitutions and preparation processes.

The colloidal silica particles used as component (A) in the silica-core silicone-shell particles of the present invention mean a dispersion in water of silica particles comprising $SiO_2$ as a basic unit. Silica particles having an average particle diameter of 4 to 300 nm, preferably 30 to 150 nm, are suitable for use in the present invention. Although there are two types of such colloidal silicas from their characteristics, i.e., the acid type and alkaline type, a suitable type can be selected according to the conditions for emulsion polymerization.

The shells which are the other component, component (B), of the colloidal silica-core silicone-shell particles of the present invention are composed of the organosiloxy group and/or polyorganosiloxane described above. In component (B), it is preferred that 0.02 to 100 mole % of the sum of $R^1$ and $R^2$ are groups containing a reactive unsaturated group.

The shell is preferably a polyorganosilaxane comprising a hydrolyzate or condensate of an organosilicon compound (a) represented by the formula $$R^3{}_b Si(OR)^4{}_{4-b} \qquad (III)$$

wherein $R^3$ which may be the same or different each represents a substituted or unsubstituted monovalent hydrocarbon group having 1 to 8 carbon atoms, $R^4$ represents an alkyl group having 1 to 6 carbon atoms, and b is an integer of 1 to 3, and/or a polycondensate of the organosilicon compound (a) and a polyorganosiloxane having 2 to 10 silicon atoms and not having a hydroxyl group, containing a structural unit represented by the average composition formula $$R_c{}^5 SiO_{\frac{4-c}{2}} \qquad (IV)$$

wherein $R^5$ which may be the same or different each represents a substituted or unsubstituted monovalent hydrocarbon group, and c is a number of 0.3 to 3.0, wherein 0.02 to 100 mole % of the sum of $R^3$ and $R^5$ are groups containing a reactive unsaturated group.

Examples of the reactive unsaturated group include the following groups.

$$CH_2 = CH - O - (CH_2)_n - \qquad (V)$$

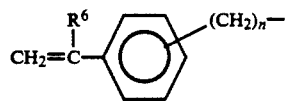
(VI)

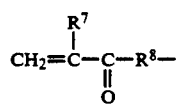
(VII)

Other examples of reactive unsaturated group-containing groups are represented by the following formula $$CH_2 = CH - (CH_2)_n - \qquad (VIII)$$

In the above formulae, n is an integer of 0 to 10.

Specific examples of the reactive unsaturated group-containing groups represented by formula (V) above include vinyloxypropyl group, vinyloxyethoxypropyl group, vinyloxyethyl group, vinyloxyethoxyethyl group, and the like. Of these, vinyloxypropyl group and vinyloxyethoxypropyl group are preferred.

In the case where the reactive unsaturated group is an ethylenically unsaturated group represented by the above formula (VI), $R^6$ represents hydrogen atom or an alkyl group having 1 to 6 carbon atoms, preferably hydrogen atom or an alkyl group having 1 or 2 carbon atoms, more preferably hydrogen atom or methyl group. Specific examples of groups containing the ethylenically unsaturated group represented by the formula (VI) include vinylphenyl group, 1-(vinylphenyl)ethyl group, 2-(vinylphenyl)ethyl group, (vinylphenyl)methyl group, isopropenylphenyl group, 2-(vinylphenoxy)ethyl group, 3-(vinylbenzoyloxy)propyl group, 3-(isopropenyl)propyl group, and the like. Of these, vinylphenyl group, 2-(vinylphenyl)ethyl group, and 1-(vinylphenyl)ethyl group are preferred.

In the case where the reactive unsaturated group is an ethylenically unsaturated group represented by the above formula (VII), $R^7$ represents hydrogen atom or methyl group and $R^8$ represents an alkylene group having 1 to 6 carbon atoms, —O—, —S—, or a group of the formula

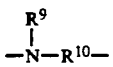

wherein $R^9$ represents a monovalent hydrocarbon group having 1 to 6 carbon atoms or (meth)acryloyl group, and $R^{10}$ represents an alkylene group having 1 to 6 carbon atoms. Specific examples of groups containing the ethylenically unsaturated group represented by the formula (VII) include γ-acryloxypropyl group, γ-methacryloxypropyl group, N-methacryloyl-N-methyl-γ-aminopropyl group, N-methacryloyl-N-ethyl-γ-aminopropyl group, N-acryloyl-N-methyl-γ-aminopropyl group, N,N-bis(methacryloyl)-γ-aminopropyl group, and the like. Preferred of these are N-methacryloyl-N-methyl-γ-aminopropyl group and N-acryloyl-N-methyl-γ-aminopropyl group.

In the case where the reactive unsaturated group is an ethylenically unsaturated group-containing group represented by the above formula (VIII), n is an integer of 0 to 10. Specific examples of the ethylenically unsaturated group-containing group represented by the formula (VIII) include vinyl group, allyl group, homoallyl (3-butenyl) group, 5-hexenyl group, 7-octenyl group, and the like. Of these, vinyl group and allyl group are preferred.

If the amount of silicon-bonded organic groups containing such a reactive unsaturated group is below 0.02 mol % of the total amount of the silicon-bonded organic groups, a high graft ratio cannot be obtained in graft polymerization of the resulting silica-core silicone-shell particles with an organic monomer.

The colloidal silica-core silicone-shell particles of the present invention can be obtained by subjecting the above-described colloidal silica, component (A), and either the organosilicon compound (a) of the formula (III) alone or a combination of the organosilicon compound of the formula (III) and the polyorganosiloxane (b) of the formula (IV), as component (B), to polycondensation in an aqueous medium in the presence of an effective amount of an emulsifying agent or an emulsifying agent mixture.

The organosilicon compound (a) of the formula (III) used as part or all of component (B) in the present invention contains both a reactive unsaturated group as described above and an alkoxy group. Examples of this organosilicon compound include silane compounds such as (vinyloxypropyl)methyldimethoxysilane, (vinyloxyethoxypropyl)methyldimethoxysilane, p-vinylphenylmethyldimethoxysilane, 1-(m-vinylphenyl)methyldimethylisopropoxysilane, 2-(p-vinylphenyl)ethylmethyldimethoxysilane, 3-(p-vinylphenoxy)propyltriethoxysilane, 3-(p-vinylbenzoyloxy)propylmethyldimethoxysilane, 1-(p-vinylphenyl)ethylmethyldimethoxysilane, 1-(o-vinylphenyl)-1,1,2-trimethyl-2,2-dimethoxydisilane, 1-(p-vinylphenyl)-1,1-diphenyl-3-ethyl-3,3-diethoxydisiloxane, m-vinylphenyl-[3-(triethoxysilyl)propyl]diphenylsilane, [3-(p-isopropenylbenzoylamino)propyl]phenyldipropoxysilane, γ-acryloxypropylmethyldiethoxysilane, γ-methacryloxypropylmethyldimethoxysilane, γ-methacryloxypropyltrimethoxysilane, N-methacryloyl-N-methyl-γ-aminopropylmethyldimethoxysilane, N-acryloyl-N-methyl-γ-aminopropylmethyldimethoxysilane, N,N-bis(methacryloyl)-γ-aminopropylmethyldimethoxysilane, N,N-bis(acryloyl)-γ-aminopropylmethyldimethoxysilane, N-methacryloyl-N-methyl-γ-aminopropylphenyldiethoxysilane, 1-methacryloxypropyl-1,1,3-trimethyl-3,3-dimethoxydisiloxane, vinylmethyldimethoxysilane, vinylethyldiisopropoxysilane, vinyldimethylethoxysilane, allylmethyldimethoxysilane, 5-hexenylmethyldiethoxysilane, and γ-octenylethyldiethoxysilane. These can used alone or as a mixture of two or more thereof.

Preferred of the above examples of the organosilicon compound of the formula (III) are (vinyloxypropyl)methyldimethoxysilane, (vinyloxyethoxypropyl)methyldimethoxysilane , p-vinylphenylmethyldimethoxysilane, 2-(p-vinylphenyl)ethylmethyldimethoxysilane, 3-(p-vinylbenzoyloxy)propylmethyldimethoxysilane, 1-(p-vinylphenyl)ethylmethyldimethoxysilane, methacryloxypropylmethyldimethoxysilane, N-methacryloyl-N-methyl-γ-aminopropylmethyldimethoxysilane, N-acryloyl-N-methyl-γ-aminopropylmethyldimethoxysilane, vinylmethyldimethoxysilane, and allylmethyldimethoxysilane. More preferred of these are p-vinylphenylmethyldimethoxysilane, γ-methacryloxypropylmethyldimethoxysilane, N-methacryloyl-N-methyl-γ-aminopropylmethyldimethoxysilane, and vinylmethyldimethoxysilane.

The polyorganosiloxanes (b) which are used to form the shell portion, component (B), in the present invention, contain structural units represented by the above formula (IV), contain no hydroxyl group, and have 2 to 10 silicon atoms. The structure of the organosiloxane (b) is not particularly limited and may be straight-chain, branched, or cyclic, but the organosiloxane having a cyclic structure is preferred. An organosiloxane having more than 10 silicon atoms is disadvantageous in that when emulsion polymerization of this organosiloxane is conducted it is difficult to incorporate colloidal silica particles into organosiloxane micelles and, hence, part of the colloidal silica particles used do not take part in the formation of core-shell particles. As a result, an emulsion is obtained which contains free colloidal silica particles and polyorganosiloxane micelles in addition to the desired core-shell particles. Further, use of a hydroxyl group-containing polyorganosiloxane should be avoided since such an organosiloxane undergoes a polycondensation reaction in the initial stage of emulsification to yield an organosiloxane having more than 10 silicon atoms, which causes the same problem as described above.

Examples of the substituted or unsubstituted monovalent hydrocarbon group contained in the polyorganosiloxane (b) which can be used as part of component (B) include methyl group, ethyl group, propyl group, vinyl group, phenyl group, and those groups substituted with a halogen atom or cyano group. Examples of the reactive unsaturated group contained in the polyorganosiloxane (b) include the same reactive unsaturated groups as described above.

Examples of the organosiloxane (b) which can be used as part of component (B) include cyclic siloxanes such as hexamethylcyclotrisiloxane, octamethylcyclotetrasiloxane, decamethylcyclopentasiloxane, dodecamethylcyclo- hexasiloxane, trimethyltriphenylcyclotrisiloxane, tris-(3,3,3-trifluoropropyl)trimethylcyclotrisiloxane, 1,3,5,7-tetra(vinyloxypropyl)tetramethylcyclotetrasiloxane, 1,3,5,7-tetra(vinyloxyethoxypropyl)tetramethylcyclotetrasiloxane, 1,3,5,7-tetra(p-vinylphenyl)tetramethylcyclotetrasiloxane, 1,3,5,7-tetra[1-(m-vinylphenyl)methyl]-tetramethylcyclotetrasiloxane, 1,3,5,7-tetra[2-(p-vinylphenyl)ethyl]tetramethylcyclotetrasiloxane, 1,3,5,7-tetra[3-(p-vinylphenoxy)propyl]tetramethylcyclotetra- siloxane, 1,3,5,7-tetra[3-(p-vinylbenzoyloxy)propyl]tetramethylcyclotetrasiloxane, 1,3,5,7-tetra[3-(p-isopropenylbenzoylamino)propyl]tetramethylcyclotetrasiloxane, 1,3,5,7-tetra($\gamma$-acryloxypropyl)tetramethylcyclotetrasiloxane, 1,3,5,7-tetra($\gamma$- methacryloxypropyl)tetramethylcyclotetrasiloxane, 1,3,5,7-tetra(N-methacryloyl-N-methyl-$\gamma$-aminopropyl)tetramethylcyclotetrasiloxane, 1,3,5,7-tetra(N-acryloyl-N-methyl-$\gamma$-aminopropyl)tetramethylcyclotetrasiloxane, 1,3,5,7-tetra[N,N-bis-(methacryloyl)-$\gamma$-aminopropyl]tetramethylcyclotetrasiloxane, 1,3,5,7-tetra[N,N-bis(acryloyl-$\gamma$-aminopropyl]tetramethylcyclotetrasiloxane, 1,3,5,7-tetravinyltetramethylcyclotetrasiloxane, octavinylcyclotetrasiloxane, 1,3,5-trivinyltrimethylcyclotrisiloxane, 1,3,5,7-tetraallyltetramethylcyclotetrasiloxane, 1,3,5,7-tetra(5-hexenyl)tetramethylcyclotetrasiloxane, 1,3,5,7-tetra(7-octenyl)tetramethylcyclotetrasiloxane, and the like. These can be used alone or as a mixture of two or more thereof. In addition to the above examples, straight-chain or branched organosiloxanes can be used. However, if a straight-chain or branched organosiloxane is used, the organosiloxane in which the terminals of the molecular chain have been blocked with a substituent other than hydroxyl, such as an alkoxy group, trimethylsilyl group, dimethylvinylsilyl group, methylphenylvinylsilyl group, methyldiphenylsilyl group 3,3,3-trifluoropropyldimethylsilyl group, or the like is preferably used.

The above-described organosilicon compound (a) alone or a combination of the organosilicon compound (a) and the above-described polyorganosiloxane (b) is suitably selected as component (B) such that the resulting colloidal silica-core silicone-shell particles of the present invention have a silicone shell content of from 0.1 to 95% by weight, preferably from 20 to 95% by weight, and that the proportion of the groups containing a reactive unsaturated group is from 0.02 to 100 mol % per mole of all the silicon-bonded organic groups in the silicone shell portion.

The colloidal silica-core silicone-shell particles can be obtained by mixing, with shearing, the above-described colloidal silica as component (A) with either the organosilicon compound (a) alone or a combination of the organosilicon compound (a) and the polyorganosiloxane (b), as component (B), in the presence of water and an emulsifying agent by means of a homogenizer or other device, and then allowing the resulting mixture to undergo condensation.

The emulsifying agent mainly functions as a surfactant for emulsifying component (B), i.e., the organosilicon compound (a) alone or a combination of the organosilicon compound (a) and the organosiloxane (b), in the presence of suitable amount of water and component (A), and at the same time, also hydrolyzes the alkoxy groups in (a), followed by polycondensation, or functions as a catalyst for the polycondensation reaction of the hydrolyzate of (a), or (b). The emulsifying agent may be anionic type or cationic type.

Examples of the anionic emulsifying agent include aliphatic-substituted benzenesulfonic acids in which the aliphatic substituent has a carbon chain having 6 to 18 carbon atoms, aliphatic-substituted naphthalenesulfonic acids, aliphatic sulfonic acids, silylalkylsulfonic acids, aliphatic-substituted (diphenyl ether)sulfonic acids, and the like. Of these, aliphatic-substituted benzenesulfonic acids are preferred.

Examples of the cationic emulsifying agent include quaternary ammonium salt-type surface active agents such as alkyltrimethylammonium salts (e.g., octadecyltrimethylammonium chloride and hexadecyltrimethylammonium chloride), dialkyldimethylammonium salts (e.g., dioctadecyldimethylammonium chloride, dihexadecyldimethylammonium chloride, and didodecyldimethylammonium chloride), benzalkonium chloride-type compounds (e.g., octadecyldimethylbenzylammonium chloride and hexadecyldimethylbenzylammonium chloride), and others. However, since some kinds of the above quaternary ammonium salt-type surfactants show low catalytic activity, addition of an alkali catalyst such as sodium hydroxide or potassium hydroxide is required in such a case.

The amount of the emulsifying agent used is generally from 0.1 to 5 parts by weight, preferably from about 0.3 to 3 parts by weight, per 100 parts by weight of the sum of component (A) and component (B) which is either the organosilicon compound (a) alone or a combination of the organosilicon compound (a) and the organosiloxane (b). If required and necessary, a non-ionic emulsifying agent can also be used in combination with an anionic or cationic emulsifying agent.

In the production of colloidal silica-core silicone-shell particles in accordance with the present invention, an acidic colloidal silica should be used when an anionic emulsifying agent is used, while an alkaline colloidal silica should be used when a cationic emulsifying agent is used, for the purpose of maintaining the colloidal silica in a stable state.

The amount of water used in the production of colloidal silica-core silicone-shell particles is generally from 100 to 500 parts by weight, preferably from 200 to 400 parts by weight, per 100 parts by weight of the sum of component (A) and component (B) which is either the organosilicon compound (a) alone or a combination of the organosilicon compound (a) and the organosiloxane (b). The temperature for the condensation or polycondensation is generally from 5 to 100° C. In conducting the process for producing colloidal silica-core silicone-shell particles in accordance with the present invention, a crosslinking agent can be added as an optional component in order to improve the strength of the silicone shells portion.

Examples of the crosslinking agent include trifunctional crosslinking agents such as methyltrimethoxysilane, phenyltrimethoxysilane, ethyltriethoxysilane, and (3,3,3-trifluoropropyl)trimethoxysilane, tetrafunctional crosslinking agents such as tetraethoxysilane, and the like. The amount of the crosslinking agent added is generally about 10% by weight or less, preferably about 5% by weight or less, based on the total weight of component (B) which is either the organosilicon compound (a) alone or a combination of the organosilicon compound (a) and the polyorganosiloxane (b).

The thus-obtained emulsion of colloidal silica-core silicone-shell particles is acidic or alkaline depending o the emulsion polymerization conditions. Therefore, this emulsion, if required, can be neutralized with an alkali or acid. Examples of the alkali include sodium hydroxide, potassium hydroxide, sodium carbonate, sodium hydrogen carbonate, triethanolamine, triethylamine, or the like. Examples of the acid include hydrochloric acid, sulfuric acid, nitric acid, acetic acid, oxalic acid, or the like. According to the present invention, the silica-core silicone-shell particles only can be separated and used. Alternatively, the particles can also be used in an emulsion form. If the silica-core silicone-shell particles are used in the form of an emulsion, the particles should be used, in which the amount of the polyorganosilaxane which constitutes the shell portion is 20 to 95% by weight of the particles and the average particle diameter is from about 4 to 400 nm. Further, the content of such silica-core silicone-shell particles in the emulsion should be at least 30% by weight. The reason for the above is that even if an emulsion of silica-core silicone-shell particles, which does not meet any of above requirements, is blended with an organic resin or subjected to graft polymerization, etc. in order to produce a reinforcing effect of the particles, it is difficult to obtain the desired effect.

The present invention will be explained in more detail by reference to the following examples, which should not be construed to be limiting the scope of the invention. In these examples, all parts and percents are by weight unless otherwise indicated, and various measurements and determinations were made according to the following methods.

The average particle diameter of raw material colloidal silicas, colloidal silica-core silicone-shell particles, and graft copolymer micelles was measured by means of laser particle diameter-analyzing system LPA-3000S/3100 manufactured by Otsuka Electronics Co., Ltd., Japan, employing dynamic light-scattering method.

Graft ratio and degree of grafting for colloidal silica-core silicone-shell particles were determined as follows, with the colloidal silica-core silicone-shell particles being regarded as a graft copolymer, i.e., the colloidal silica cores as main polymer chain and the silicone shells as graft polymer.

An emulsion containing core-shell particles was vacuum-dried at 40° C./0.5 mmHg for 5 hours to obtain dry core-shell particles. A certain weight (l) of the dry core-shell particles were placed in cyclohexane, and this mixture was shaken with a shaking machine for 2 hours to dissolve a free polyorganosiloxane. The resulting mixture was subjected to centrifugal separation with a centrifuge at 23,000 rpm for 30 minutes, and the insoluble residue was separated. This residue was then dried at 120° C. for 1 hour in a vacuum dryer to obtain the weight (m) of the insoluble residue. The graft ratio and degree of grafting were calculated using the following equations.

Graft ratio (%) =

$$\frac{(m) - (l) \times (\text{core content in core-shell particles})}{(l) \times (\text{core content in core-shell particles})} \times 100$$

Degree of grafting (%) =

$$\frac{(m) - (l) \times (\text{core content in core-shell particles})}{(l) - (l) \times (\text{core content in core-shell particles})} \times 100$$

With respect to a graft polymerization product obtained by grafting organic monomers onto colloidal silica-core silicone-shell particles, its graft ratio and degree of grafting were determined as follows. A certain weight (x) of the graft polymerization product was placed in acetone, and this mixture was shaken with a shaking machine for 2 hours to dissolve a free copolymer. The resulting mixture was subjected to centrifugal separation with a centrifuge at 23,000 rpm for 30 minutes, and the insoluble residue was separated. This residue was then dried at 120° C. for 1 hour in a vacuum dryer to obtain the weight (y) of the insoluble residue. The graft ratio and degree of grafting were calculated using the following equations.

Graft ratio (%) =

$$\frac{(y) - (x) \times (\text{rubber content* in graft polymerization product})}{(x) \times (\text{rubber content* in graft polymerization product})} \times 100$$

Degree of grafting (%) =

$$\frac{(y) - (x) \times (\text{rubber content* in graft polymerization product})}{(x) - (x) \times (\text{rubber content* in graft polymerization product})} \times 100$$

*Rubber content: Component (A) + component (B) (i.e., the content of core-shell particles)

In addition, the following properties were evaluated on resin compositions in accordance with the following evaluation methods.

Izod impact strength (kgf/cm$^2$) ASTM-D256, 1/4", 23° C.

Gloss (%) ASTM-D523, 45°

EXAMPLE 1

To a liquid mixture of 100 parts of an acidic colloidal silica, Snowtex OZL (manufactured by Nissan Chemical Industries, Ltd., Japan; average particle diameter 122 nm, SiO$_2$ 21.14%, Na$_2$O 0.101%, pH 2.02; hereinafter referred to as "A-1"), 47 parts of distilled water, and 0.84 part of dodecylbenzenesulfonic acid was added a mixture of 0.32 part of p-vinylphenylmethyldimethoxysilane (hereinafter referred to as "B-a-1") and 21 parts of octamethylcyclotetrasiloxane (hereinafter referred to as "B-b"). The resulting mixture was prestirred with a homomixer and then passed twice through a homogenizer at a pressure of 300 kgf/cm$^2$ to emulsify and disperse the mixture.

The above-obtained emulsified dispersion was transferred to a separable flask equipped with a condenser, a nitrogen-introducing opening, and a stirrer. The dispersion was heated at 85° C. with stirring for 5 hours, and then cooled at 5° C. for 48 hours to complete polycondensation. Thus, a polyorganosiloxane-containing emulsion was obtained.

Subsequently, the polyorganosiloxane-containing emulsion was neutralized with an aqueous sodium carbonate solution to adjust the pH of the emulsion to 7. The conversion of octamethylcyclotetrasiloxane (hereinafter referred to as "conversion of B-b") in the thus-obtained polyorganosiloxane was 99.6%.

Upon particle diameter analysis based on the dynamic light-scattering method and examination with an electron microscope, the above-obtained polyorganosiloxane was ascertained to be colloidal silica-core silicone-shell particles. That is, the particle diameter analysis using a laser particle diameter-analyzing system (LPA-3000S/3100, manufactured by Otsuka Electronics Co., Ltd.) revealed that the monodisperse particle diameter curve attributable to the raw material colloidal silica and having a peak around 122 nm had disappeared completely and a monodisperse particle diameter curve having a peak around 175 nm had newly appeared. Further, as a result of examination with an electron microscope, silicone particle images were only observed which had vague and uncertain peripheries as different from spherical colloidal silica particles, and images of the raw material silica particles were not observed at all. The examination with an electron microscope further revealed that in most of the silica-core silicone-shell particles, the whole surface of each colloidal silica particle was covered with the silicone shell, while some silica-core silicone-shell particles had a structure in which the surface of the silica particle was partly covered by the shell.

Thereafter, part of the above-obtained core-shell particle emulsion having a solid content of 25.1% was poured into a large amount of acetone to precipitate the core-shell particles. This precipitate was filtered off and then dried in a vacuum dryer at 50° C. for 12 hours, thereby obtaining agglomerates of core-shell particles. With the thus-obtained core-shell particles being regarded as a graft polymerization product, its graft ratio and degree of grafting were 38.3% and 38.3%, respectively.

Elementary analysis of the above-obtained core-shell particle agglomerates for determining the C and H contents, IR analysis, and $^1$H-, $^{13}$C-, and $^{29}$Si-NMR analysis revealed that the proportion of the silicone shells was 49.2% of the whole core-shell particles and the proportion of p-vinylphenyl groups to all the organic groups contained in the silicone shells was 0.27%.

The above-obtained colloidal silica-core silicone-shell particles were subjected to graft copolymerization with vinyl monomers as follows.

35 Parts on a solid content basis of the above-obtained core-shell emulsion was mixed with 0.5 part of sodium dodecylbenzenesulfonate and 140 parts of distilled water. This mixture was transferred to a separable flask equipped with a dropping funnel, a condenser, a nitrogen-introducing opening, and a stirrer. To the flask were added 15.81 parts of styrene, which amount corresponds to 34% of the total styrene amount, 6.29 parts of acrylonitrile, which amount corresponds to 34% of the total acrylonitrile amount, 0.2 part of sodium ethylenediaminetetraacetate, 0.25 part of sodium formaldehyde sulfoxylate, 0.004 part of ferrous sulfate, and 0.074 part of cumene hydroperoxide. The resulting mixture was heated to 70° C. in a nitrogen stream. After polymerization was conducted for 1 hour, a liquid mixture composed of the remaining 30.69 parts of styrene, the remaining 12.21 parts of acrylonitrile, 1.084 parts of sodium dodecylbenzenesulfonate, 42 parts of distilled water, 0.12 part of cumene hydroperoxide, and 0.06 part of t-dodecyl mercaptan was added to the reaction mixture through the dropping funnel over a period of 3 hours. After completion of the addition, polymerization reaction was conducted for 1 hour, and the reaction mixture was them cooled.

The thus-obtained graft copolymer latex was poured into warm water containing dissolved therein 2 parts of calcium chloride dihydrate, thereby conducting salting out and coagulation. Thereafter, the resulting thermoplastic resin containing a graft copolymer was separated, thoroughly washed with water, and then dried at 80° C for 16 hours to complete purification.

The graft copolymer obtained above was evaluated for graft ratio and degree of grafting. The results obtained are shown in Table 1.

57 Parts of the above-obtained thermoplastic resin powder was blended with 43 parts of a copolymer (AS resin) obtained by the emulsion polymerization of styrene with acrylonitrile in a weight ratio of 75:25 in terms of the amounts of monomers charged, thereby preparing a thermoplastic resin composition. This thermoplastic resin composition was extruded into pellets by means of a twin-screw extruder at a cylinder temperature of 230° C.

The above-obtained thermoplastic resin composition had excellent weathering resistance, sliding properties, impact resistance, and appearance. Its impact resistance and gloss were evaluated on molded test pieces obtained by molding the pelletized thermoplastic resin composition, and the results obtained are shown in Table 1.

EXAMPLES 2 AND 3

Polyorganosiloxane emulsions having solid contents of 25.1% and 25%, respectively, were prepared under the same conditions as in Example 1 except that the amounts of the acidic colloidal silica, distilled water, dodecylbenzenesulfonic acid, p-vinylphenylmethyldimethoxysilane, and octamethylcyclotetrasiloxane were changed as shown in Table 1.

As a result of particle diameter analysis based on dynamic light-scattering method and examination with a electron microscope, the above-obtained polyorganosiloxanes in respective Examples were ascertained to be monodisperse colloidal silica-core silicone-shell particles having an average particle diameter of about 184 nm and 157 nm, respectively. The core-shell particles of each Example were evaluated in the same manner as in Example 1, and the results obtained are shown in Table 1.

Under the same conditions as in Example 1, the core-shell particles of each Example were subjected to graft copolymerization with vinyl monomers, and the resulting graft copolymer was blended with an AS resin to obtain a thermoplastic resin composition in the form of pellets.

For each Example, the graft ratio and degree of grafting of the graft copolymer and the impact resistance and gloss of the thermoplastic resin composition were measured under the same conditions as in Example 1. The results obtained are shown in Table 1.

EXAMPLES 4 TO 6

Polyorganosiloxane emulsions having solid contents of 25.0%, 25.0%, and 25.1%, respectively, were prepared under the same conditions as in Example 1 except that γ-methacryloxypropylmethyldimethoxysilane (hereinafter referred to as "B-a-2 "), N-methacryloyl-N-methyl-γ-aminopropylmethyldimethoxysilane (hereinafter referred to "B-a-3"), and vinylmethyldimethoxysilane (hereinafter referred to as "B-a-4") were used as an organosilicon compound, in Examples 4, 5, and 6, respectively.

As a result of particle diameter analysis based on dynamic light-scattering method and examination with an electron microscope, the above-obtained polyorganosiloxanes in respective Examples were ascertained to be colloidal silica-core silicone-shell particles having a monodisperse particle diameter distribution (average particle diameter; 175 nm, 176 nm, and 176 nm, respectively). The core-shell particles of each Example were evaluated in the same manner as in Example 1, and the results obtained are shown in Table 1.

Under the same conditions as in Example 1, the core-shell particles of each Example were subjected to graft copolymerization with vinyl monomers, and the resulting graft copolymer was blended with an AS resin to obtain a thermoplastic resin composition in the form of pellets.

For each Example, the graft ratio and degree of grafting of the graft copolymer and the impact resistance and gloss of the thermoplastic resin composition were measured under the same conditions as in Example 1. The results obtained are shown in Table 1.

EXAMPLE 7

A polyorganosiloxane emulsion having a solid content of 24.8% was prepared under the same conditions as in Example 1 except that Snowtex OL (manufactured by Nissan Chemical Industries, Ltd.; average particle diameter 84 nm, $SiO_2$ 20.66%, $Na_2O$ 0.019%, pH 2.78; hereinafter referred to as "A-2") was used as an acidic colloidal silica.

As a result of particle diameter analysis based on dynamic light-scattering method and examination with an electron microscope, the above-obtained polyorganosiloxane emulsion was ascertained to be a dispersion of colloidal silica-core silicone-shell particles having a monodisperse particle diameter distribution (average particle diameter 155 nm). The core-shell particles were evaluated in the same manner as in Example 1, and the results obtained are in Table 1.

Under the same conditions as in Example 1, the core-shell particles obtained above were subjected to graft copolymerization with vinyl monomers, and the resulting graft copolymer was blended with an AS resin to obtain a thermoplastic resin composition in the form of pellets.

The graft ratio and degree of grafting of the graft copolymer and the impact resistance and gloss of the thermoplastic resin composition were measured under the same conditions as in Example 1. The results obtained are shown in Table 2.

EXAMPLE 8

To a liquid mixture composed of 100 parts of an alkaline colloidal silica, Snowtex ZL (manufactured by Nissan Chemical Industries, Ltd.; average particle diameter 110 nm, $SiO_2$ 40.23%, $Na_2O$ 0.036%, pH 9.72; hereinafter referred to as "A-3"), 1.94 parts of distilled water, 6.5 parts of dioctadecyldimethylammonium chloride, and 1.5 parts of potassium hydroxide was added a mixture of 0.64 part of p-vinylphenylmethyldimethoxysilane and 42 parts of octamethylcyclotetrasiloxane. The resulting mixture was prestirred with a homomixer and then subjected twice to treatment with a homogenizer at a pressure of 300 kgf/cm² to emulsify and disperse the mixture.

The above-obtained emulsified dispersion was transferred to a separable flask equipped with a condenser, a nitrogen-introducing opening, and a stirrer. The dispersion was heated at 85° C. with stirring for 5 hours, and then cooled at 5° C. for 48 hours to complete polycondensation. Subsequently, the thus-obtained polyorganosiloxane emulsion was neutralized with hydrochloric acid to adjust the pH of the emulsion to 7. The conversion of octamethylcyclotetrasiloxane in the above polyorganosiloxane was 97.6%.

As a result of particle diameter analysis based on dynamic light-scattering method and examination with an electron microscope, the above-obtained polyorganosiloxane emulsion (solid content 24.0%) was ascertained to be a colloidal silica-core silicone-shell particles having a monodisperse particle diameter distribution (average particle diameter 173 nm). The core-shell particles were evaluated in the same manner as in Example 1, and the results obtained are shown in Table 2.

Under the same conditions as in Example 1, the core-shell particles obtained above were subjected to graft copolymerization with vinyl monomers, and the resulting graft copolymer was blended with an AS resin to obtain a thermoplastic resin composition in the form of pellets.

The graft ratio and degree of grafting of the graft copolymer and the impact resistance and gloss of the thermoplastic resin composition were measured under the same conditions as in Example 1. The results obtained are shown in Table 2.

EXAMPLE 9

To a liquid mixture composed of 100 parts of an acidic colloidal silica, Snowtex O (manufactured by Nissan Chemical Industries, Ltd.; average particle diameter 31 nm, $SiO_2$ 20.53%, $Na_2O$ 0.034%, pH 2.58; hereinafter referred to as "A-4") and 0.43 part of dodecylbenzenesulfonic acid was added 0.32 part of p-vinylphenylmethyldimethoxysilane. The resulting mixture was prestirred with a homomixer and then subjected twice to treatment with a homogenizer at a pressure of 300 kgf/cm² to emulsify and disperse the mixture.

The above-obtained emulsified dispersion was transferred to a separable flask equipped with a condenser, a nitrogen-introducing opening, and a stirrer. The dispersion was heated at 85° C. with stirring for 5 hours, and then cooled at 5° C. for 24 hours to complete polycondensation. Subsequently, the resulting emulsion was neutralized with aqueous sodium carbonate solution to adjust the pH of the emulsion to 7. The thus-obtained emulsion had a solid content of 21.6%.

As a result of particle diameter analysis based on dynamic light-scattering method and examination with an electron microscope, the above-obtained polyorganosiloxane emulsion (solid content 21.6%) was ascertained to be colloidal silica-core silicone-shell particles having a monodisperse particle diameter distribution (average particle diameter 33 nm). The core-shell particles were evaluated in the same manner as in Example 1, and the results obtained are shown in Table 2.

Using the above-obtained core-shell particles composed mainly of colloidal silica particles, copolymerization with vinyl monomers was conducted under the same conditions as in Example 1. Through salting out and coagulation, drying, and purification, the copolymer formed was recovered in a recovery rate of 98.2%. It was ascertained that most of the core-shell particles had been incorporated into the thus-obtained copolymer.

Under the same conditions as in Example 1, the above-obtained graft copolymer was blended with an AS resin to obtain a thermoplastic resin composition in the form of pellets.

The graft ratio and degree of grafting of the graft copolymer and the impact resistance and gloss of the thermoplastic resin composition were measured under the same conditions as in Example 1. The results obtained are shown in Table 2.

EXAMPLE 10

To a liquid mixture composed of 100 parts of an acidic colloidal silica, Snowtex OZL (manufactured by Nissan Chemical Industries, Ltd.), 47 parts of distilled water, and 0.84 part of dodecylbenzenesulfonic acid was added a mixture of 0.16 part of dimethyldimethoxysilane and 21 parts of octamethylcyclotetrasiloxane. The resulting mixture was prestirred with a homomixer and then subjected twice to treatment with a homogenizer at a pressure of 300 kgf/cm$^2$ to emulsify and disperse the mixture.

The above-obtained emulsified dispersion was transferred to a separable flask equipped with a condenser, a nitrogen-introducing opening, and a stirrer. The dispersion was heated at 90° C. with stirring for 5 hours, and then cooled at 5° C. for 48 hours to complete polycondensation, thereby obtaining a polyorganosiloxane emulsion.

Subsequently, the above-obtained polyorganosiloxane emulsion was neutralized with aqueous sodium carbonate solution to adjust the pH of the emulsion to 7. The conversion of octamethylcyclotetrasiloxane in the above-obtained polyorganosiloxane was 99.5%.

Upon particle diameter analysis based on the dynamic light-scattering method and examination with an electron microscope, the above-obtained polyorganosiloxane was ascertained to be colloidal silica-core silicone-shell particles. That is, particle diameter analysis using a laser particle diameter-analyzing system (LPA-3000S/3100 manufactured by Otsuka Electronics Co., Ltd.) revealed that the monodisperse particle diameter distribution curve attributable to the raw material colloidal silica and having a peak around 122 nm had disappeared completely and a monodisperse particle diameter distribution curve having a peak around 168 nm had newly appeared. Further, as a result of examination with an electron microscope, silicone particle images were only observed which had vague and uncertain peripheries as different from spherical colloidal silica particles, and images of the raw material silica particles were not observed at all. The examination with an electron microscope further revealed that in most of the silica-core silicone-shell particles, the whole surface of each colloidal silica particle was covered with the silicone shell, while some silica-core silicone-shell particles had a structure in which the surface of the silica particle was partly covered by the shell.

Thereafter, part of the above-obtained core-shell particle emulsion having a solid content of 24.9% was poured into a large amount of acetone to precipitate the core-shell particles. This precipitate wa filtered off and then dried in a vacuum dryer at 50° C. for 12 hours, thereby obtaining agglomerates of core-shell particles. With the thus-obtained core-shell particles being regarded as a graft polymerization product, its percentage in grafting and degree of grafting were 38.3% and 38.3% respectively.

Elementary analysis of the above-obtained core-shell particle agglomerates for determining the C and H contents, IR analysis, and $^1$H-, $^{13}$C-, and $^{29}$Si-NMR analysis revealed that the proportion of the silicone shells was 48.2%.

In all the above Examples, the present invention is explained by the use of colloidal silica-core silicone-shell particles in the form of an emulsion. However, the same results or tendencies were observed also in the case where the colloidal silica-core silicone-shell particles were separated and used.

COMPARATIVE EXAMPLE 1

A polyorganosiloxane emulsion was prepared under the same conditions as in Example 1 except that p-vinylphenylmethyldimethoxysilane was not used.

As a result of particle diameter analysis based on dynamic light-scattering method and examination with an electron microscope, the above-obtained polyorganosiloxane was ascertained to be colloidal silica-core silicone-shell particles having a monodisperse particle diameter distribution. The core-shell particles thus obtained were evaluated in the same manner as in Example 1, and the results obtained are shown in Table 2.

Under the same conditions as in Example 1, the core-shell particles obtained above were subjected to graft copolymerization with vinyl monomers, and the resulting graft copolymer was blended with an AS resin to obtain a thermoplastic resin composition in the form of pellets.

The graft ratio and degree of grafting of the graft copolymer and the impact resistance and gloss of the thermoplastic resin composition were measured under the same conditions as in Example 1. The results obtained are shown in Table 2.

COMPARATIVE EXAMPLE 2

The same colloidal silica as used in Example 9 was heated and then cooled under the same conditions as in Example 9 except that p-vinylphenylmethyldimethoxysilane was not used.

Subsequently, the thus-treated colloidal silica was copolymerized with vinyl monomers under the same conditions as in Example 1. Through salting out and coagulation, drying, and purification, the resulting product was recovered. The recovery rate was 48.6%, on the basis of the total yield obtained by adding the copolymer component calculated from the total conversion (in terms of mole percentage of monomer consumed in the reaction) of the vinyl monomer to the weight of the colloidal silica in Example 1. It was ascertained that most of the colloidal silica particles remained unincorporated into the resin obtained.

TABLE 1

|  | Example | | | | | |
|---|---|---|---|---|---|---|
|  | 1 | 2 | 3 | 4 | 5 | 6 |

Components for core-shell

TABLE 1-continued

|  | Example | | | | | |
|---|---|---|---|---|---|---|
|  | 1 | 2 | 3 | 4 | 5 | 6 |
| particle emulsion | | | | | | |
| Component (A) | | | | | | |
| (A-1) | 100 | 100 | 100 | 100 | 100 | 100 |
| (A-2) | | | | | | |
| (A-3) | | | | | | |
| (A-4) | | | | | | |
| Component (B) | | | | | | |
| (B-a-1) | 0.32 | 0.63 | 0.16 | | | |
| (B-a-2) | | | | 0.32 | | |
| (B-a-3) | | | | | 0.32 | |
| (B-a-4) | | | | | | 0.32 |
| (B-b) | 21 | 42 | 10.5 | 21 | 21 | 21 |
| Emulsifying agent | 0.84 | 1.26 | 0.63 | 0.84 | 0.84 | 0.84 |
| Water | 47 | 110 | 15.5 | 47 | 47 | 47 |
| Conversion of (B-b) [%] | 99.6 | 99.7 | 99.6 | 98.9 | 99.3 | 99.7 |
| Properties of core-shell particles | | | | | | |
| Average particle diameter [nm] | 175 | 184 | 157 | 175 | 176 | 176 |
| Percentage of silicon shells | 49.2 | 65.7 | 33.1 | 49.6 | 50.0 | 49.2 |
| Percentage of reactive unsaturated group | 0.27 | 0.27 | 0.26 | 0.24 | 0.24 | 0.42 |
| Graft ratio [%] | 38.3 | 37.8 | 43.4 | 40.3 | 37.6 | 41.0 |
| Degree of grafting [%] | 38.3 | 18.5 | 84.3 | 40.3 | 37.6 | 41.0 |
| Properties of graft copolymer | | | | | | |
| Graft ratio [%] | 102 | 104 | 98 | 100 | 89 | 25 |
| Degree of grafting [%] | 55 | 56 | 53 | 54 | 48 | 13 |
| Properties of thermoplastic resin composition | | | | | | |
| Izod impact strength | 32.0 | 37.3 | 34.3 | 36.3 | 33.0 | 7.0 |
| Gloss [%] | 72 | 82 | 65 | 71 | 69 | 52 |

TABLE 2

|  | Example | | | Comparative Example | |
|---|---|---|---|---|---|
|  | 7 | 8 | 9 | 1 | 2 |
| Components for core-shell particle emulsion | | | | | |
| Component (A) | | | | | |
| (A-1) | | | | 100 | |
| (A-2) | 100 | | | | |
| (A-3) | | 100 | | | |
| (A-4) | | | 100 | | 100 |
| Component (B) | | | | | |
| (B-a-1) | 0.32 | 0.64 | 0.32 | | |
| (B-a-2) | | | | | |
| (B-a-3) | | | | | |
| (B-a-4) | | | | | |
| (B-b) | 21 | 42 | — | 21 | — |
| Emulsifying agent | 0.84 | 6.5 | 0.43 | 0.84 | 0.43 |
| Water | 47 | 1.94 | — | 47 | — |
| Conversion of (B-b) [%] | 99.8 | 97.9 | — | 99.5 | — |
| Properties of core-shell particles | | | | | |
| Average particle diameter [nm] | 155 | 173 | 33 | 177 | 30 |
| Percentage of silicon shells | | 49.3 | 48.7 | 1.3 | 49.3 |
| Percentage of reactive unsaturated group | 0.26 | 0.26 | 50.0 | — | — |
| Graft ratio [%] | 52.3 | 35.6 | — | 37.6 | — |
| Degree of grafting [%] | 52.3 | 35.6 | — | 37.6 | — |
| Properties of graft copolymer | | | | | |
| Graft ratio [%] | 105 | 102 | 110 | 3 | — |
| Degree of grafting [%] | 57 | 55 | 59 | 2 | — |
| Properties of thermoplastic resin composition | | | | | |
| Izod impact strength | 34.0 | 30.2 | 16.3 | 4.0 | — |
| Gloss [%] | 71 | 71 | 54 | 42 | — |

As described above, the colloidal silica-core silicone-shell particles of the present invention each has a structure such that the shell made of a polyorganosiloxane containing a reactive unsaturated group covers the core of a colloidal silica particle through siloxane bonds. Therefore, when the silica-core silicone-shell particles are applied to the modification of organic polymers, the colloidal silica particles can fully exhibit their reinforcing effect. Further, due to the reactive unsaturated groups bonded to the siloxane side chains in the silicone shells, graft polymerization of the core-shell particles with organic monomers can provide a graft copolymer having a higher graft ratio.

In addition, in the case where a polymer having poor compatibility with colloidal silicas and/or polyorganosiloxanes is modified with the colloidal silica-core silicone-shell particles described above, the core-shell particles can be made compatible with such a polymer by graft-polymerizing onto the particles a monomer which gives a polymer having compatibility with the polymer to be modified by blending. Thus, properties of colloidal silica particles and/or a polyorganosiloxane can be imparted to such polymers which have poor compatibility with colloidal silicas and/or polyorganosiloxanes. This means that by imparting properties of colloidal silica particles and/or polyorganosiloxanes to various kinds of polymers, polymers having improved impact strength, sliding properties, weathering properties, and other properties can be obtained.

Furthermore, the colloidal silica-core silicone-shell particles of the present invention can easily and efficiently form graft copolymers with various monomers. In view of the advantage that the core-shell particles of the present invention can impart properties of silica and/or silicones to various polymers having poor compatibility with silica and/or silicones, the core-shell particles of the present invention and the production process therefor greatly contribute to the polymer alloy technology and, hence, are of considerable industrial significance.

While the invention has been described in detail and with reference to specific embodiments thereof, it will be apparent to one skilled in the art that various changes and modifications can be made therein without departing from the spirit and scope thereof.

What is claimed is:

1. Colloidal silica-core silicone-shell particles comprising
   (A) from 99.9 to 5% by weight of cores which are colloidal silica particles, and
   (B) from 0.1 to 95% by weight of shells which are a polyorganosiloxane comprising a condensate of an organosilicon compound (a) represented by the formula:

$$R^3{}_b Si(OR^4)_{4-b} \quad (III)$$

wherein the $R^3$ groups, which may be the same or different, each represents a substituted or unsubstituted monovalent hydrocarbon group having 1 to 8 carbon atoms, $R^4$ represents an alkyl group having 1 to 6 carbon atoms, and b is an integer of 1 to 3, and polyorganosiloxane (b) having 2 to 10 silicon atoms and not containing a hydroxyl group, containing a structural unit represented by the average composition formula:

$$R^5{}_c SiO_{\frac{4-c}{2}} \quad (IV)$$

wherein the $R^5$ groups, which may be the same or different, each represents a substituted or unsubstituted monovalent hydrocarbon group, and c is the number of 0.3 to 3.0, wherein the molar content of component (b) is greater than the molar content of component (a), said colloidal silica particles are in the form of a dispersion in water of the silica particles, the core-shell particles have an average particle diameter of from 4 to 400 nm, and from 0.02 to 100 mol% of the sum of the $R^3$ and $R^5$ groups contain a reactive unsaturated group.

2. An emulsion containing, as a solid component, at least 30% by weight of silica-core silicone-shell particles which comprise
   (A) from 80 to 5% by weight of cores which are colloidal silica particle and
   (B) from 20 to 95% by weight of shells which are a polyorganosiloxane comprising a condensate of an organosilicon compound (a) represented by the formula:

$$R^3{}_b Si(OR^4)_{4-b} \quad (III)$$

wherein the $R^3$ groups, which may be the same or different, each represents a substituted or unsubstituted monovalent hydrocarbon group having 1 to 8 carbon atoms, $R^4$ represents an alkyl group having 1 to 6 carbon atoms, and b is an integer of 1 to 3, and a polyorganosiloxane (b) having 2 to 10 silicon atoms and not containing a hydroxyl group, containing a structural unit represented by the average composition formula:

$$R^5{}_c SiO_{\frac{4-c}{2}} \quad (IV)$$

wherein the $R^5$ groups, which may be the same or different, each represents a substituted or unsubstituted monovalent hydrocarbon group, and c is the number of 0.3 to 3.0, wherein the molar content of component (b) is greater than the molar content of component (a), said colloidal silica particles are in the form of a dispersion in water of the silica particles, the core-shell particles have an average particle diameter of form 4 to 400 nm, and from 0.02 to 100 mol% of the sum of the $R^3$ and $R^5$ groups contain a reactive unsaturated group.

3. A process for producing an emulsion containing silica-core silicone-shell particles, which comprises emulsifying
   (A) 100 parts by weight, on a solid content basis, of a colloidal silica,
   (B) from 1 to 1,900 parts by weight of a mixture of a polyorganosiloxane comprising a condensate of an organosilicon compound (a) represented by the formula:

$$R^3{}_b Si(OR^4)_{4-b} \quad (III)$$

wherein the $R^3$ groups, which may be the same or different, each represents a substituted or unsubstituted monovalent hydrocarbon group having 1 to 8 carbon atoms, $R^4$ represents an alkyl group having 1 to 6 carbons atoms, and b is an integer of 1 to 3, and a polyorganosiloxane (b) having 2 to 10 silicon atoms and not containing a hydroxyl group, containing a structural unit represented by the average composition formula:

$$R^5{}_c SiO_{\frac{4-c}{2}} \quad (IV)$$

wherein the $R^5$ groups, which may be the same or different, each represents a substituted or unsubstituted monovalent hydrocarbon group, and c is a number of 0.3 to 3.0, wherein the molar content of component (b) is greater than the molar content of component (a),
   (c) from 0.1 to 5 parts by weight of an anionic or cationic emulsifying agent per 100 parts by weight of the sum of ingredients (A) and (B) above, and
   (D) from 100 to 500 parts by weight of water per 100 parts by weight of the sum of ingredients (A) and (B) above, and
   simultaneously conducting hydrolysis of the organosilicon compound (a) and copolycondensation reaction of the hydrolyzed product and the polyorganosiloxane (b), wherein said colloidal silica particles are in the form of a dispersion in water of the silica particles, the core-shell particles have an average particle diameter of from 4 to 400 nm, and from 0.02 to 100 mol % of the sum of the $R^3$ and $R^5$ groups contain a reactive unsaturated group.

* * * * *